United States Patent

Kim

[11] Patent Number: 6,035,695
[45] Date of Patent: Mar. 14, 2000

[54] CALIBRATION METHOD USING A SENSOR

[75] Inventor: Dong Buhm Kim, Suwon, Rep. of Korea

[73] Assignee: Samsung Electronics Co., Ltd., Suwon, Rep. of Korea

[21] Appl. No.: 09/143,649

[22] Filed: Aug. 31, 1998

[30] Foreign Application Priority Data

Aug. 30, 1997 [KR] Rep. of Korea ...................... 97-44863

[51] Int. Cl.$^7$ .................... G01R 17/02; G05B 19/04; B25J 9/04
[52] U.S. Cl. ............... 73/1.79; 73/1.88; 395/89; 901/9
[58] Field of Search ................... 73/1.79, 1.88; 901/9; 395/89

[56] References Cited

U.S. PATENT DOCUMENTS

| | | |
|---|---|---|
| 4,380,696 | 4/1983 | Masaki .......................................... 901/9 |
| 4,753,569 | 6/1985 | Pryor ............................................ 901/9 |
| 4,873,655 | 10/1989 | Kondraske ................................ 73/1.88 |
| 5,086,641 | 2/1992 | Roselli ...................................... 73/1.79 |
| 5,331,232 | 7/1994 | Moy et al. .................................. 901/9 |
| 5,418,890 | 6/1991 | Ishihara et al. ............................ 395/89 |

Primary Examiner—Hezron Williams
Assistant Examiner—Chad Soliz
Attorney, Agent, or Firm—Burns, Doane, Swecker & Mathis, L.L.P.

[57] ABSTRACT

Disclosed is a calibration method for compensating an offset occurring when parts in an industrial robot are exchanged with new ones. A signal generation part is attached to a moving part of the robot. While the moving part is moving, a signal detection part detects the movement of the signal generation part with a sensor therein, and calibration data are generated on the basis of the detected signals. Preset calibration data are amended using a difference between the generated calibration data and the preset calibration data, so that the offset is compensated.

4 Claims, 2 Drawing Sheets

CALIBRATION METHOD USING A SENSOR

BACKGROUND OF THE INVENTION

1. Field of the Invention

The present invention relates to a calibration method using a sensor, and more particularly, to a calibration method for compensating an offset occurring when a driving element such as a motor and a belt in a transmission part attached to a body of the robot or a sensor for sensing the movement of a shaft of an arm in the robot is exchanged with a new one.

2. Prior Art

When a mechanical appliance requiring a precise position control such as an industrial robot undergoes a troubleshooting on a part or entire parts thereof, or it is disassembled and assembled in order to exchange parts therein with new ones, an offset may occur which is a variation of the initial position of a moving part such as an arm in the robot from a preset position thereof. Such an offset results in the reduced accuracy of the position control on the basis of the preset calibration data. Therefore, a new calibration should be necessarily performed so that the preset calibration data are amended, in order to compensate the offset after the parts are exchanged with new ones.

In conventional art, if the offset has to be compensated after the parts in a robot body such as a motor are exchanged, the calibration has been performed by utilizing a jig for exclusive use in calibration, or on the basis of marks signed on the robot body.

The calibration using the calibration jig is performed according to the following steps.
(1) detaching a working tool attached to the robot body.
(2) attaching a calibration tool.
(3) performing calibration using the calibration tool.
(4) amending calibration data or compensating an offset with the performed calibration results.
(5) detaching the calibration tool.
(6) attaching the working tool again.

Such a calibration method using the calibration jig requires a high preciseness of the calibration jig. Further, the working tool and the calibration tool must be exchanged with each other two times, so the calibration process is very troublesome and much time is consumed, which may cause a lowering of productivity.

Meanwhile, the calibration using the marks inscribed on the robot body is performed according to the following steps.
(1) moving every part of the body to the marked positions.
(2) amending the calibration data or compensating the offset using the present position of the robot.

Such a method does not bring about the troublesome job of exchanging the tools as the case of utilizing the calibration jig, however, method is not preferable since the preciseness of the calibration is low.

SUMMARY OF THE INVENTION

The present invention has been proposed to overcome the above- described problems in the prior art, and accordingly it is the object of the present invention to provide a calibration method of a robot, which can amend the offset simply and precisely without the troublesome job of exchanging the tools in order to use a calibration jig.

To achieve the above object, the present invention provides a calibration method of an industrial robot, comprising the steps of: preparing a signal generation part attached on a moving part of the robot, the signal generation part for providing a signal about a position of the moving part, and a signal detection part for detecting the signal from the signal generation part; moving the moving part; generating calibration data on the basis of the position of the moving part detected by the signal detection part; calculating a difference between the generated calibration data and preset calibration data; and amending the preset calibration data on the basis of the difference so that an offset is compensated.

Here, the step of moving the moving part comprises the steps of, rotating the moving part in one rotational direction, stopping the moving part when a variation of the signal detected by the signal detection part is checked, and rotating the moving part in a reverse rotational direction. Furthermore, in the step of generating the calibration data, the calibration data are generated on the basis of the position of the moving part at a time point that the variation of the signal detected by the signal detection part is checked during the step of rotating the moving part in the reverse rotational direction.

Preferably, the moving part is rotated at a high rotational velocity during a rotation thereof in the one rotational direction, and at a low rotational velocity during a rotation thereof in the reverse rotational direction.

According to the present invention, the calibration can be performed in a short period of time without the inconvenience of exchanging a calibration jig. Furthermore, the preciseness of calibration is high.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENT

Hereinafter, the present invention will be described in detail with reference to the accompanying drawings.

Figure 1:
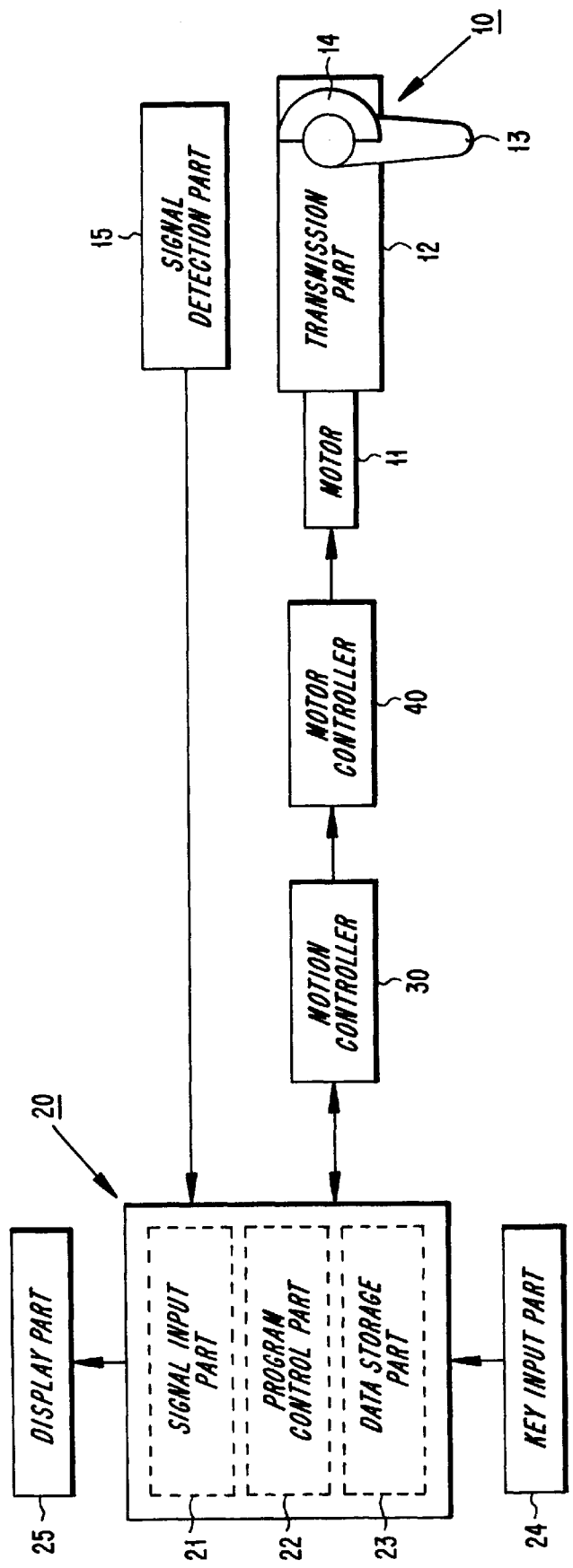
FIG. 1 is a block diagram of a robot control system for realizing a calibration method according to the present invention.

FIG. 1 is a block diagram of a robot control system for realizing a calibration method according to the present invention. The robot 10 has a motor 11, a transmission part 12, an arm 13, a signal generation part 14, and a signal detection part 15.

The motor 11 generates a force for driving the robot 10. The transmission part 12 comprises a belt, gears, etc., and transmits the driving force of the motor 11 to the arm 13. The arm 13 is moved by the driving force transmitted by the transmission part 12. The signal generation part 14 is attached to the arm 13, and moves together with the arm 13. The signal generation part 14 provides information about the position of the arm 13. The signal detection part 15 has a sensor (not shown) for sensing the signal generation part 14, and detects the signal generated by the signal generation part 14.

The robot control system comprises a superior controller 20, a motion controller 30, and a motor controller 40.

The superior controller 20 is a computer for controlling the operation of the robot 10, and has a signal input part 21, a program control part 22, and a data storage part 23. The signal input part 21 is an interfacing circuit for receiving the signals from the signal detection part 15. The program control part 22 controls the robot 10 according to the signal input through the signal input part 21 on the basis of programs stored therein. Furthermore, a key input part 24 for receiving the commands of a user and a display part 25 for displaying the operational status of the robot 10 and all relevant data are connected to the superior controller 20.

The motion controller 30 controls the motor controller 40 according to the commands of the superior controller 20, and the motor controller 40 directly controls the operation of the motor 11. In other words, when the superior controller 20 analyzes the commands of the user input through the key input part 24 and then commands the operation of the robot 10, the motion controller 30 receives the commands and drives the motor 11 through the motor controller 40. As the motor 11 is driven, the driving force thereof is transmitted to the arm 13 through the transmission part 12, and the arm 13 is rotated for the desired operation of the robot 10.

While the arm 13 is rotating, the signal generation part 14 attached thereto rotates with it, and the signal detection part 15 detects the position of the signal generation part 14. In such a situation, through the signal input part 21 the superior controller 20 receives the signal detected by the signal detection part 15, and determines the position of the arm 13 and performs required control.

Figure 2:
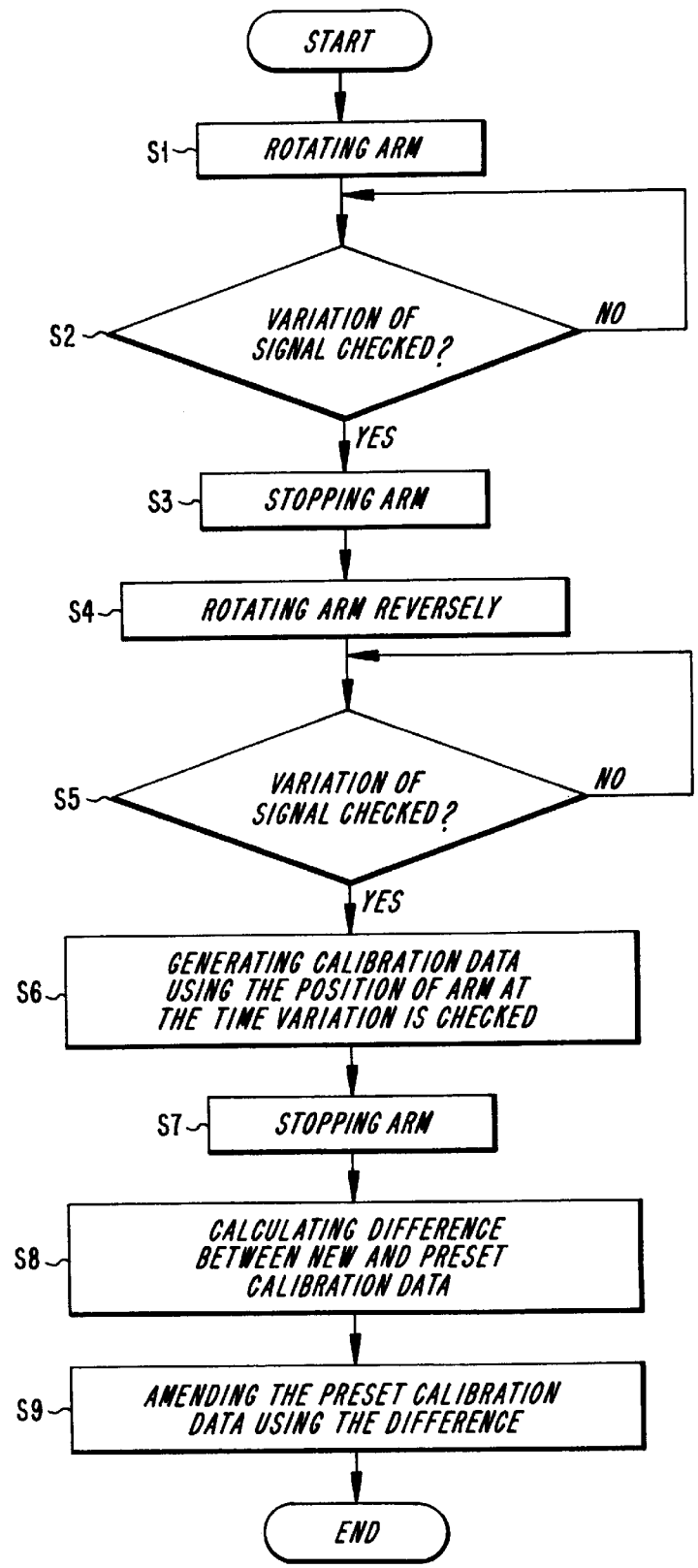
FIG. 2 is a flow chart of the calibration method according to the present invention.

Hereinbelow, the calibration method according to the present invention will be described with reference to such a robot control system and FIG. 2.

When a signal from the key input part 24 operated by a user is input to the superior controller 20, the superior controller 20 commands the motion controller 30 to rotate the arm 13 in one rotational direction, and the motion controller 30 drives the motor 11 of the robot 10 through the motor controller 40 according to the command of the superior controller 20. Then, the motor 11 is rotated, and the driving force thereof is transmitted to the arm 13 through the transmission part 12, whereby the one arm 13 is rotated S1 in the rotational direction. In such a situation, the motor 11 rotates the arm 13 preferably at a high rotational velocity.

While the arm 13 is rotating, the signal generation part 14 attached to the arm 13 also rotates together with the arm 13. The superior controller 20 checks S2 for any variation of the signal detected by the signal detection part 15 with respect to preset reference values. If no variation of the detected signal is detected, the rotation of the arm 13 is continued, and if a variation is detected, the velocity of the motor 11 is reduced gradually to stop S3 the arm 13.

Then, the motor 11 is driven reversely, preferably at a low rotational velocity so as to rotate S4 the arm 13 in a reverse rotational direction. While the arm 13 is rotating reversely at a low rotational velocity, the superior controller 20 checks S5 again for a variation of the signal detected by the signal detection part 15. If no variation is detected, the arm 13 is continued to rotate reversely.

If a variation of the signal detected by the signal detection part is detected while the arm 13 is rotating reversely, the superior controller 20 generates S6 calibration data using the rotational position of the arm 13 at the time point that the variation is checked, and stops the motor 11 to stop S7 the movement of the arm 13.

Then, a difference between the calibration data achieved by the above-described process and preset calibration data is calculated S8, and the preset calibration data are amended S9 using the difference so that the offset is compensated. The amended calibration data are stored in the data storage part 23.

As illustrated above, new calibration data can be achieved by performing the calibration for compensating the offset with the existent robot control system.

According to the present invention, the calibration can be performed in a short period of time without the inconvenience of exchanging tools as the conventional calibration method using a calibration jig. Furthermore, the calibration can be performed more precisely in comparison with the conventional calibration method using marks.

Although the present invention has been described and illustrated in detail, it is clearly understood that the same is by way of illustration and example only and is not to be taken by way of limitation, wherein the spirit and scope of the present invention is limited only by the terms of the appended claims.

What is claimed is:

1. A calibration method of an industrial robot, the robot being normally operable to carry out an industrial job, the method comprising the steps of:

A. providing a signal generation part attached on a movable part of the robot for providing a signal about a position of the movable part, and a signal detection part for detecting the signal from the signal generation part;

B. acting on the movable part for producing an offset thereof from a desired initial position;

C. performing a calibration operation separate from the normal operation by moving the offset movable part;

D. generating calibration data on the basis of the position of the offset movable part detected by the signal detection part;

E. calculating a difference between the generated calibration data and preset calibration data; and F. amending the preset calibration data on the basis of the difference so that the offset is compensated;

step C further comprising the steps of:

C1. rotating the offset movable part in one rotational direction,

C2. stopping the offset movable part when a variation of the signal detected by the signal detection part is checked, and C3. rotating the offset movable part in a reverse rotational direction;

wherein step D further comprises generating the calibration data on the basis of the position of the offset movable part at a time when the variation of the signal is detected by the signal detection part during the rotation of the offset movable part in the reverse rotational direction.

2. The calibration method as claimed in claim 1, wherein the offset movable part is rotated at a higher rotational velocity during a rotation thereof in the one rotational direction, than during a rotation thereof in the reverse rotational direction.

3. A calibration method of an industrial robot, comprising the steps of:

providing a signal generation part attached on a movable part of the robot for providing a signal about a position of the movable part, and also providing a signal detection part for detecting the signal from the signal generation part;

moving the movable part;

generating calibration data on the basis of the position of the moving movable part detected by the signal detection part;

calculating a difference between the generated calibration data and preset calibration data; and amending the preset calibration data on the basis of the difference so that an offset of the movable part is compensated;

wherein the step of moving the movable part comprises the steps of:

rotating the movable part in one rotational direction, stopping the movable part when the signal detected by the signal detection part varies from a preset reference value, and rotating the movable part in a reverse rotational direction;

wherein the step of generating the calibration data comprises generating the calibration data on the basis of the position of the movable part at a time when the variation of the signal is detected by the signal detection part during the rotation of the movable part in the reverse rotational direction.

4. The calibration method as claimed in claim 3, wherein the movable part is rotated at a higher rotational velocity during a rotation thereof in the one rotational direction, than during a rotation thereof in the reverse rotational direction.

* * * * *